United States Patent

Barnes

[11] Patent Number: 5,952,995
[45] Date of Patent: Sep. 14, 1999

[54] SCROLL INDICATING CURSOR

[75] Inventor: Stacey Alan Barnes, Round Rock, Tex.

[73] Assignee: International Business Machines Corporation, Armonk, N.Y.

[21] Appl. No.: 08/797,905

[22] Filed: Feb. 10, 1997

[51] Int. Cl.[6] ................................................. G09G 5/08
[52] U.S. Cl. ..................... 345/157; 345/121; 345/123; 345/145; 345/341
[58] Field of Search ................................. 345/157, 145, 345/160, 121, 123, 163; 395/333, 334, 341, 342, 326, 357, 973; 364/236.8

[56] References Cited

U.S. PATENT DOCUMENTS

| | | | |
|---|---|---|---|
| 4,625,202 | 11/1986 | Richmond et al. | 340/709 |
| 4,698,625 | 10/1987 | McCaskill et al. | 345/157 |
| 4,786,895 | 11/1988 | Castaneda | 340/709 |
| 4,984,152 | 1/1991 | Muller | 364/200 |
| 5,122,785 | 6/1992 | Cooper | 340/710 |
| 5,196,838 | 3/1993 | Meier et al. | 345/121 |
| 5,214,414 | 5/1993 | Levine et al. | 340/709 |
| 5,252,952 | 10/1993 | Frank et al. | 345/157 |
| 5,317,306 | 5/1994 | Abraham et al. | 345/341 |
| 5,333,247 | 7/1994 | Gest et al. | 345/123 |
| 5,337,405 | 8/1994 | Lindauer et al. | 395/147 |
| 5,384,579 | 1/1995 | Nakasuji et al. | 345/123 |
| 5,442,378 | 8/1995 | Yasuhara et al. | 345/168 |
| 5,495,566 | 2/1996 | Kwatinetz | 395/157 |
| 5,510,808 | 4/1996 | Cina, Jr. et al. | 345/123 |
| 5,510,811 | 4/1996 | Tobey et al. | 345/157 |
| 5,528,260 | 6/1996 | Kent | 345/145 |
| 5,555,004 | 9/1996 | Ono et al. | 345/161 |
| 5,555,368 | 9/1996 | Orton et al. | 395/157 |
| 5,568,164 | 10/1996 | Ogawa | 345/145 |
| 5,568,603 | 10/1996 | Chen et al. | 395/155 |
| 5,581,670 | 12/1996 | Bier et al. | 395/326 |

OTHER PUBLICATIONS

Kelley, J.F. Windowing (Cursor) Control Key Legends, IBM Dec. 1983.

IBM Technical Disclosure Bulletin vol. 36 No. 4, pp. 399–403 (Apr. 1993).

IBM Technical Disclosure Bulletin vol. 36 No. 9B, pp. 233–234 (Sep. 1993).

IBM Technical Disclosure Bulletin vol. 37 No. 12, pp. 495–496 (Dec. 1994).

*Primary Examiner*—Jeffery A. Hofsass
*Assistant Examiner*—John Tweel, Jr.
*Attorney, Agent, or Firm*—Jeffrey S. LaBaw; Daniel E. Venglarik; Andrew J. Dillon

[57] ABSTRACT

Conventional scroll bars in a graphical user interface are replaced by a scroll indicating cursor. A customary cursor is augmented with indicators that appear to the sides of the cursor in the directions in which scrolling will allow additional information to be displayed. Scrolling is actuated by moving a cursor to an edge of the display in the direction of a visible indicator until the indicator is at least partially beyond the edge of the display. Less display area is required than with scroll bars and the nature of the scrolling indicator is more intuitive.

17 Claims, 8 Drawing Sheets

```
Notepad - BOOTLOG.TXT
File  Edit  Search  Help
[boot]
LoadStart = system.drv
LoadSuccess = system.drv
LoadStart = keyboard.drv
LoadSuccess = keyboard.drv
LoadStart = mouse.drv
LoadSuccess = mouse.drv
LoadStart = vga.drv
LoadSuccess = vga.drv
LoadStart = mmsound.drv
LoadSuccess = mmsound.drv
LoadStart = comm.drv
LoadSuccess = comm.drv
LoadStart = vgasys.fon
LoadSuccess = vgasys.fon
LoadStart = vgaoem.fon
LoadSuccess = vgaoem.fon
LoadStart = GDI.EXE
LoadStart = FONTS.FON
LoadSuccess = FONTS.FON
LoadStart = vgafix.fon
LoadSuccess = vgafix.fon
LoadStart = OEMFONTS.FON
LoadSuccess = OEMFONTS.FON
LoadSuccess = GDI.EXE
LoadStart = USER.EXE
INIT=Keyboard
INITDONE=Keyboard
```

SCROLL INDICATING CURSOR

BACKGROUND OF THE INVENTION

1. Technical Field

The present invention relates in general to data processing systems and in particular to control mechanisms for graphical user interfaces to data processing systems. Still more particularly, the present invention relates to an intuitive scrolling or window display control mechanism for a graphical user interface.

2. Description of the Related Art

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

The largest segment of the consuming public does not currently have access to these resources. Such consumers are typically either unable or unmotivated to acquire both the requisite hardware and software and the necessary computer skills for taking advantage of these resources. There is a need for low cost data processing systems which are simple to operate, allowing users without computer skill s the opportunity to access the Internet. This need is being addressed, to some extent, by "WebTV" systems.

In designing a low cost, simple data processing system, however, it is necessary to presume that the target user is unsophisticated and/or inexperienced. Therefore the operation of the data processing system must be both simple and intuitive, requiring little or no technical sophistication on the part of the user. In this regard, it would be advantageous to provide an intuitive mechanism for scrolling or window display control. Some users of these data processing systems will not be aware that more information is available for viewing when the display cannot contain all available information.

Figure 7:
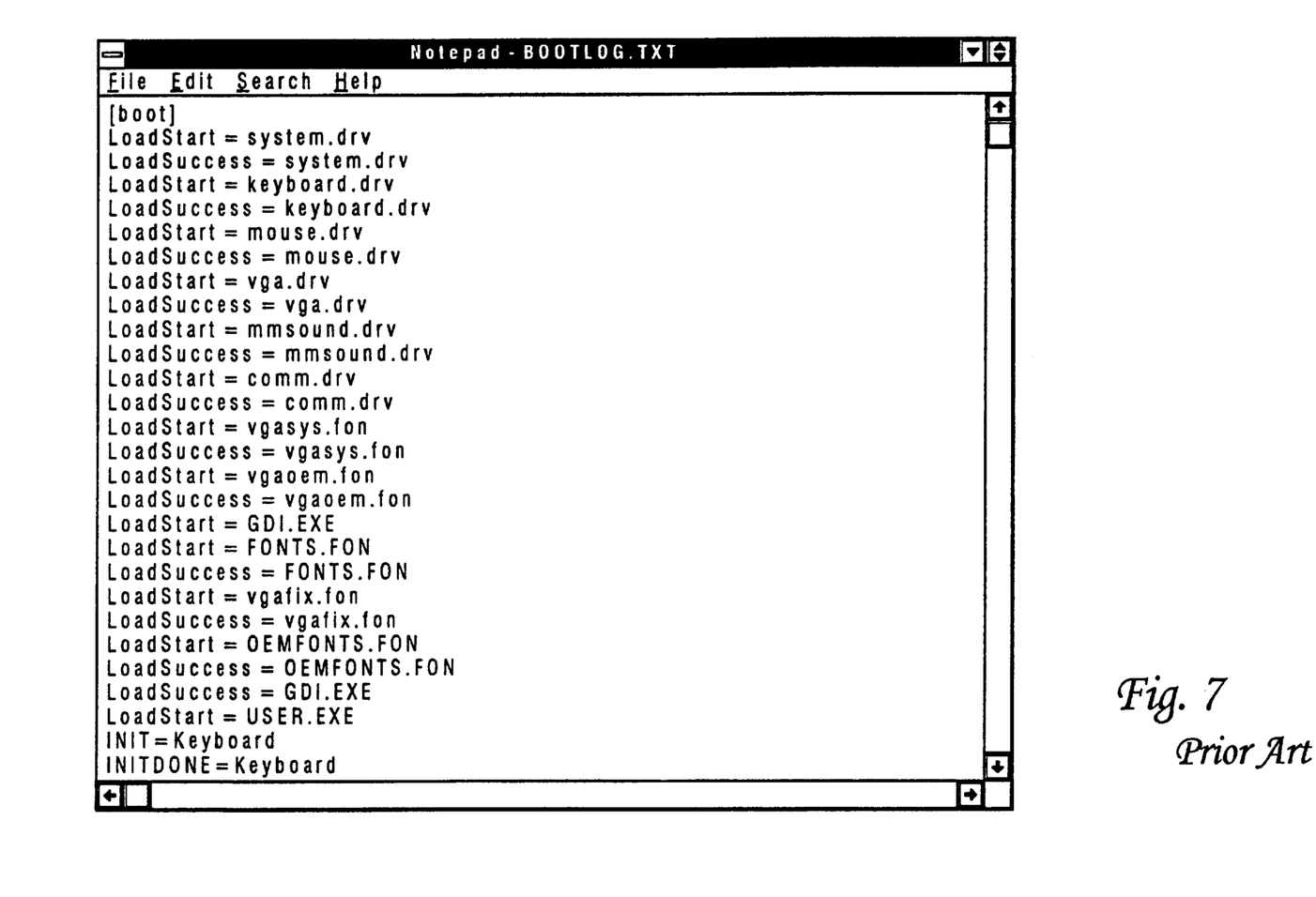
FIG. 7 depicts a prior art graphical user interface.

Conventionally scroll bars, such as those depicted in FIG. 7, are employed in the graphical user interface of a data processing system. These scroll bars may appear vertically, horizontally, or both. Typically the scroll bars contain arrows at either end for scrolling in the direction of the arrow and a slider for quickly moving the display to a given portion of the total available information.

Computer literate users are familiar with the scroll bar, its significance, and its operation. However, novice or inexperienced users who are utilizing a data processing system simply to access the Internet may have little or no computer knowledge and are unlikely to understand the scroll bar mechanism. Children, in particular, will tend to lack sufficient experience or intuitive capacity to learn to operate the scroll bar mechanism without external assistance. Additionally, television sets typically do not have the display resolution of a computer monitor, limiting the amount of viewable area on a screen at one time. Scroll bars are undesirable as they consume display real estate, which is already limited.

Unformatted text typically does not require scrolling capacity. However, information available on the Internet consists largely of spatially arranged information, including tables, graphical images, and iconic controls. The spatial arrangement of this information is typically provided using the hypertext markup language (HTML).

It is critical in data processing systems intended for non-computer users or novice users to eliminate the scroll bar and provide the user with an intuitive, meaningful mechanism for controlling the display contents of a graphical user interface in a data processing system. It would be desirable for such a mechanism to both intrinsically inform the user that more information is available for viewing in a particular direction and enable the user to intuitively operate the mechanism.

SUMMARY OF THE INVENTION

It is therefore one object of the present invention to provide an improved data processing system.

It is another object of the present invention to provide an improved control mechanism for a graphical user interface to a data processing systems.

It is yet another object of the present invention to provide an intuitive scrolling or window display control mechanism for a graphical user interface in a data processing system.

The foregoing objects are achieved as is now described. Conventional scroll bars in a graphical user interface are replaced by a scroll indicating cursor. A customary cursor is augmented with indicators that appear to the sides of the cursor in the directions in which scrolling will allow additional information to be displayed. Scrolling is actuated by moving a cursor to an edge of the display in the direction of a visible indicator until the indicator is at least partially beyond the edge of the display. Less display area is required than with scroll bars and the nature of the scrolling indicator is more intuitive.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figures 1A, 1D:
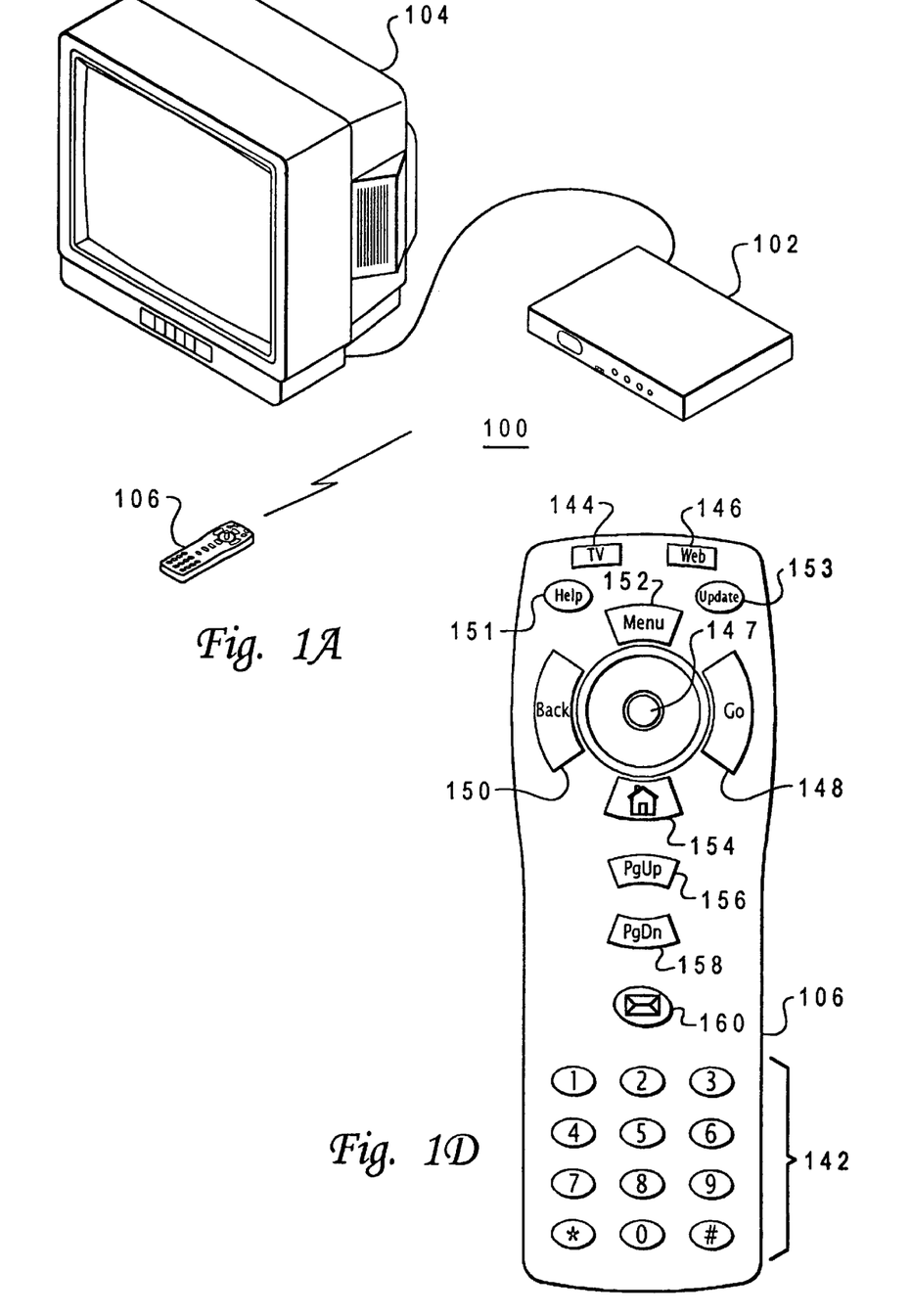
FIGS. 1A–1D depicts various pictorial representations of a data processing system in which a preferred embodiment of the present invention may be implemented.

With reference now to the figures, and in particular with reference to FIGS. 1A through 1D, various pictorial representations of a data processing system in which a preferred embodiment of the present invention may be implemented are depicted. FIG. 1A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, conventionally found in personal computers, to enable a user to "browse" the Internet. Additionally, data processing unit 102 may provide other common functions such as, for example, serving as an answering machine, transmitting or receiving facsimile transmissions, or providing voice mail facilities.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device in conventional personal computers, including the ability to move a cursor on a display and select items.

Figure 1B:
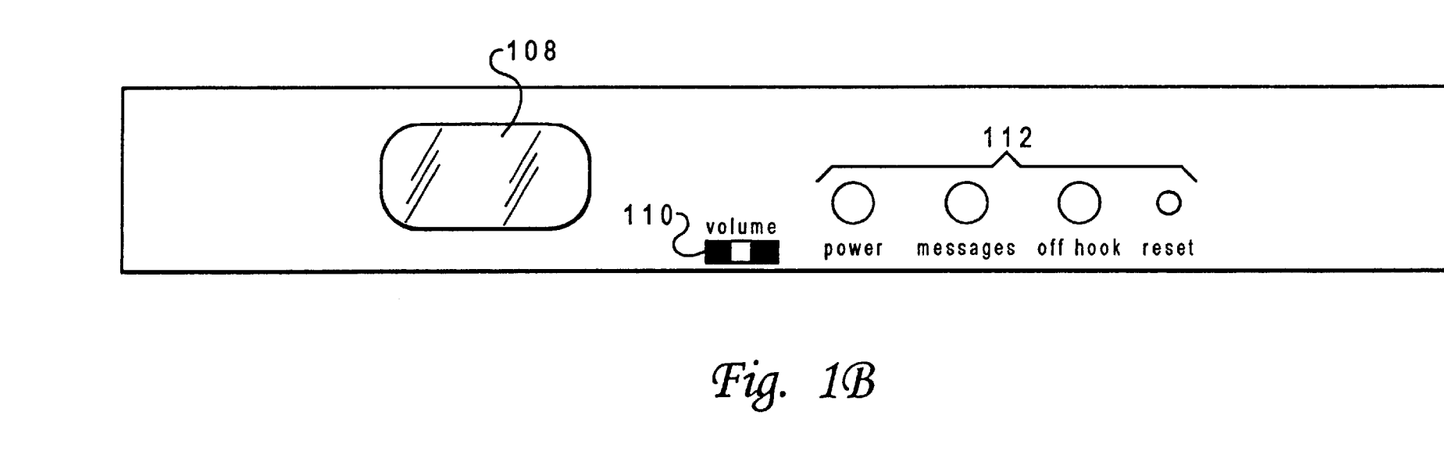

FIG. 1B is a pictorial representation of the front panel of data processing unit 102 in accordance with a preferred embodiment of the present invention. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 1C:
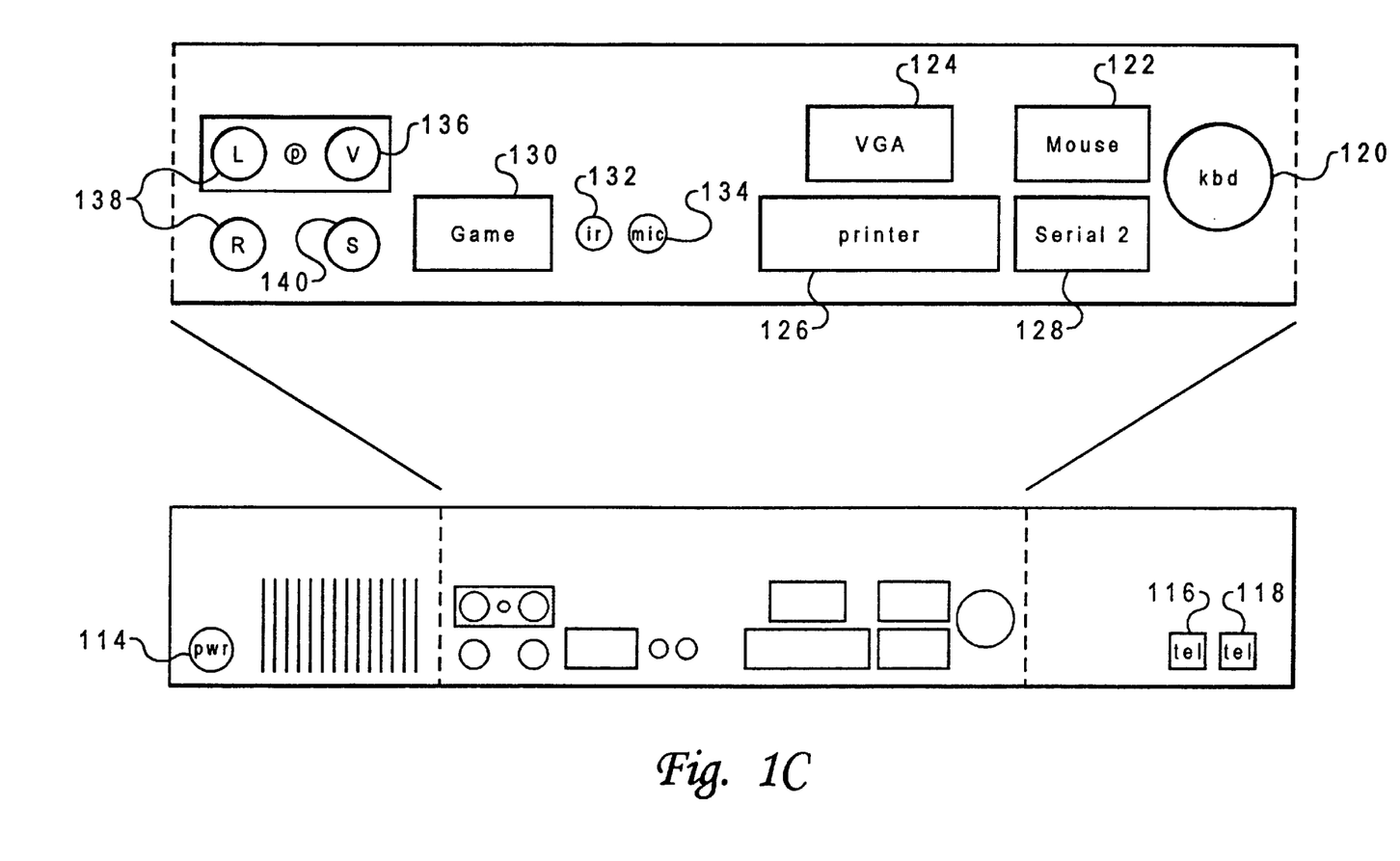

FIG. 1C is a pictorial representation of the rear panel of data processing unit 102 in accordance with a preferred embodiment of the present invention. A three wire (ground included) insulated power cord 114 passes through the rear panel. Standard telephone jacks 116 and 118 on the rear panel provide an input to a modem from the phone line and an output to a handset (not shown). The rear panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel 3/4 modulator (not shown) may be connected in-line with the antenna connection.

FIG. 1D is a pictorial representation of remote control unit 106 in accordance with a preferred embodiment of the present invention. Similar to a standard telephone keypad, remote control unit 106 includes buttons 142 for arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. A pointing device, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Menu" button 152 causes a context-sensitive menu of options to be displayed, while home button 154 allows to user to return to a default display of options. "PgUp" and "PgDn" buttons 156 and 158 allows the user to change the content of the display in display-sized blocks rather than by scrolling. The message button 160 allows the user to retrieve messages. In addition to, or in lieu of, remote control unit 106, an infrared keyboard (not shown) with an integral pointing device may be used to control data processing unit 102. The integral pointing device 147 is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 2:
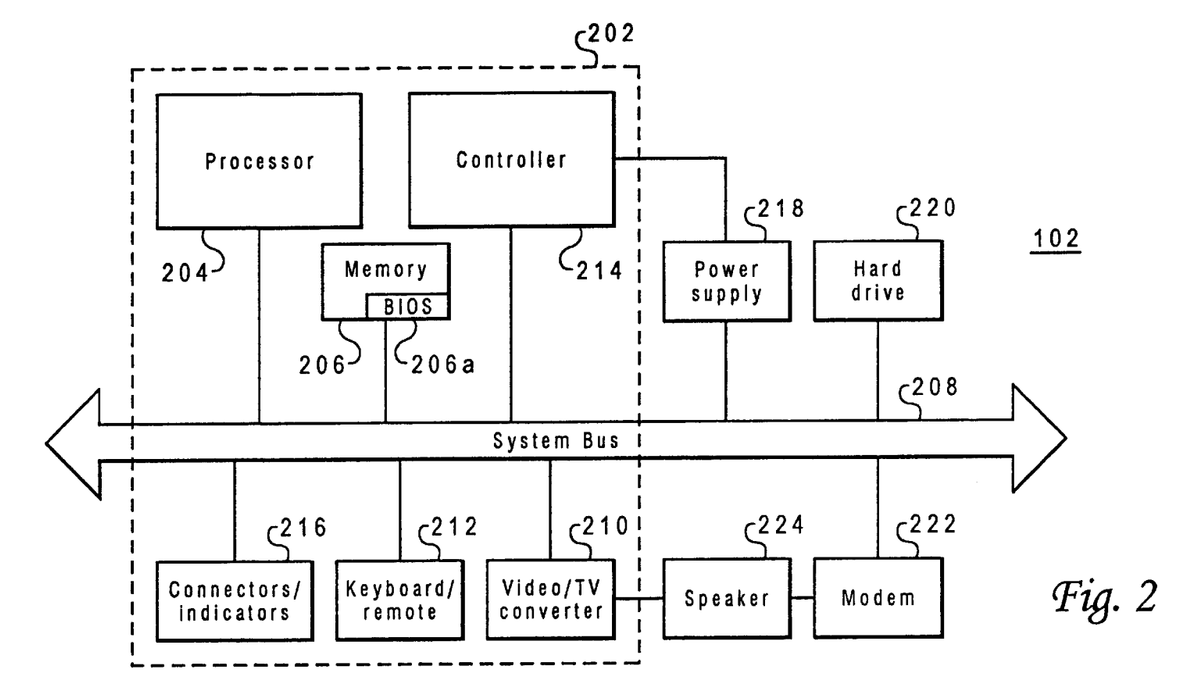
FIG. 2 is a block diagram for the major components of data processing unit in accordance with a preferred embodiment of the present invention.

Referring now to FIG. 2, a block diagram for the major components of data processing unit 102 in accordance with a preferred embodiment of the present invention is portrayed. As with conventional personal computers, data processing unit 102 includes a motherboard 202 containing a processor 204 and memory 206 connected to system bus 208. Processor 204 is preferably at least a 486 processor operating at or above 100 MHz. Memory 206 includes read only memory (ROM) 206a containing a basic input/output services (BIOS) routine and may include cache memory and/or video RAM.

Video/TV converter 210 on motherboard 202 and connected to system bus 208 generates computer video signals for computer monitors, a composite television signal, and an S-Video signal. The functionality of video/TV converter 210 may be provided utilizing commercially available video and converter chips. Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the functions provided by an infrared keyboard. Connectors/indicators 216 on motherboard 202 provide the connections and indicators on data processing unit 102 described above.

External to motherboard 202 in the depicted example are power supply 218, hard drive 220, modem 222, and speaker 224. Power supply 218 is a conventional power supply except that it receives a control signal from controller 214 which effects shut down of all power to motherboard 202, hard drive 220, and modem 222. In some recovery situations, removing power and rebooting is the only guaranteed method of resetting all of these devices to a known state. Thus power supply 218, in response to a signal from controller 214, is capable of powering down and restarting data processing unit 102.

Hard drive 220 contains operating system and applications software for data processing unit 102, which preferably includes: IBM DOS 7.0, a product of International Business Machines Corporation in Armonk, N.Y.; Windows 3.1, a product Microsoft Corporation in Redmond, Wash.; and Netscape Navigator, a product of Netscape Communications Corporation in Mountain View, Calif. Data may also be stored on hard drive 220. Modem 222, inserted into a slot mounted sideways on motherboard 202, is preferably a 33.6 kbps modem supporting the V.42bis, V34bis, V.34, V.17 Fax, MNP 1–5, and AT command sets.

Controller 214 is preferably one or more of the 805x family controllers. Controller 214 is continuously powered and, when data processing unit 102 is turned on, monitors the system for a periodic "ping" indicating that data processing unit 102 is operating normally. In the event that controller 214 does not receive a ping within a prescribed timeout period, controller 214 removes power from the system and restarts the system. This may be necessary, for example, when the system experiences a general protection fault. If multiple attempts to restart the system prove unsuccessful, controller 214 shuts off data processing unit 102 and signals that service is required through indicators 216. Thus, data processing unit 102 is capable of self-recovery in some circumstances without involvement by a user.

Controller 214 also receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use and specifies the boot sector selection during any power off-on cycle.

Those skilled in the art will recognize that the components depicted in FIGS. 1A–1D and 2 and described above may be varied for specific applications or embodiments. Such variations in which the present invention may be implemented are considered to be within the spirit and scope of the present invention.

Figure 3:
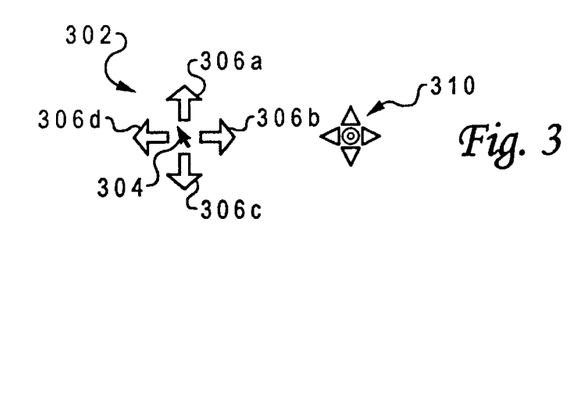
FIG. 3 depicts pictorial representations of scroll indicating cursors in accordance with a preferred embodiment of the present invention.

With reference now to FIG. 3, pictorial representations of scroll indicating cursors in accordance with a preferred embodiment of the present invention are depicted. The mechanisms for generating display of objects such as scroll indication cursor 302 on a screen is well known within the art. Scroll indicating cursor 302 includes a cursor 304 and indicators 306a–306d. The scroll indicating cursor of the present invention is not intended to replace a cursor, merely to augment existing cursors by providing the user with additional information. Cursor 304 and indicators 306a–306d may be generated and controlled separately or, alternatively, in a combined fashion. Cursor 304 includes a hotpoint for designating where selection is made, such as the arrow tip of the cursor 304 or the center of "bullseye" cursor within scroll indicating cursor 310 depicted in FIG. 3. Indicators 306a–306d are only displayed when additional information may be displayed by scrolling in the direction of the indicator. Thus indicator 306a is only displayed when additional information may be viewed by scrolling upward, indicator 306b is only displayed when additional information may be viewed by scrolling to the right, indicator 306c is only displayed when additional information may be viewed by scrolling downward, and indicator 306d is only displayed when additional information may be viewed by scrolling to the left. If all available information may be displayed on a screen, indicators 306a–306d are not displayed and only cursor 304 of scroll indicating cursor 302 is displayed. In this manner, the user is provided with intuitive information regarding where additional information may be found.

Indicators 306a–306d may also be employed to actuate a mechanism scrolling the display in a given direction. As used herein, scrolling the display in a given direction means moving the display window such that the center of the display window is moved in that direction. The displayed items are actually moved in the opposite direction within the display, to make room for additional information. However, a direction of scrolling is determined by the direction in which the display window is moved within the body of available information to be displayed.

Simply by moving scroll indicating cursor 302 to the edge of a display so that a given indicator is off the display, a user may actuate a mechanism for scrolling in the direction of the indicator. Thus, for example, when scroll indicating cursor 302 is moved to the top of a display, so that indicator 306a is no longer visible within the display, the display is scrolled upward. Similarly moving scroll indicating cursor 302 to other edges of the display, so that an indicator is no longer visible, causes the display to be scrolled in the direction of the indicator. By moving scroll indicating cursor 302 to a corner of the display, the display may be scrolled in two directions simultaneously.

As depicted by scroll indicating cursor 310, the cursor and the indicators are not limited to any particular shape. However, the shapes selected should intuitively indicate the respective functions of the cursor and indicator portions of a scroll indicating cursor.

Figure 4A:
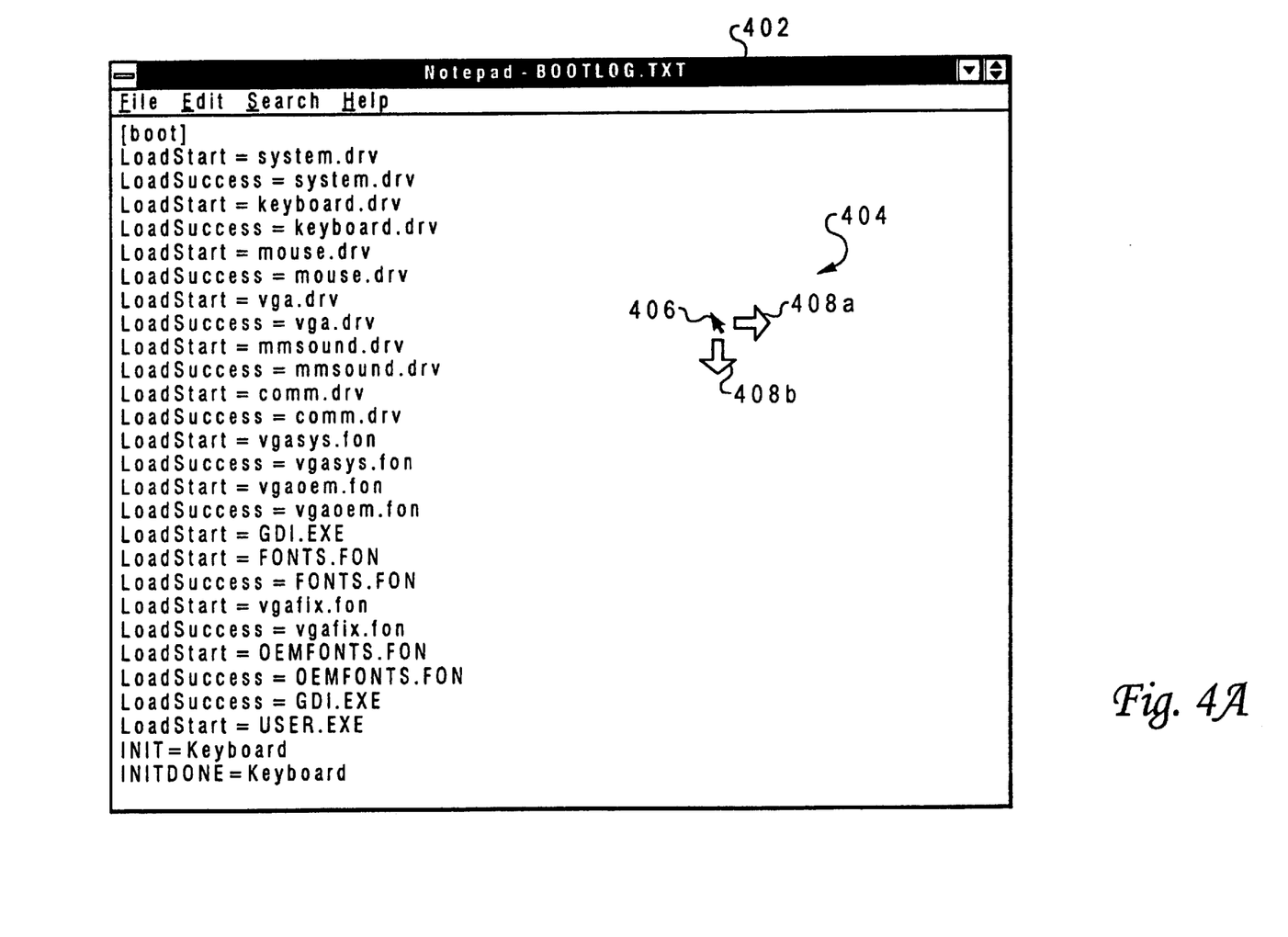
FIGS. 4A–4B are pictorial representations of a graphical user interface employing a scroll indicating cursor in accordance with a preferred embodiment of the present invention.
Figure 4B:
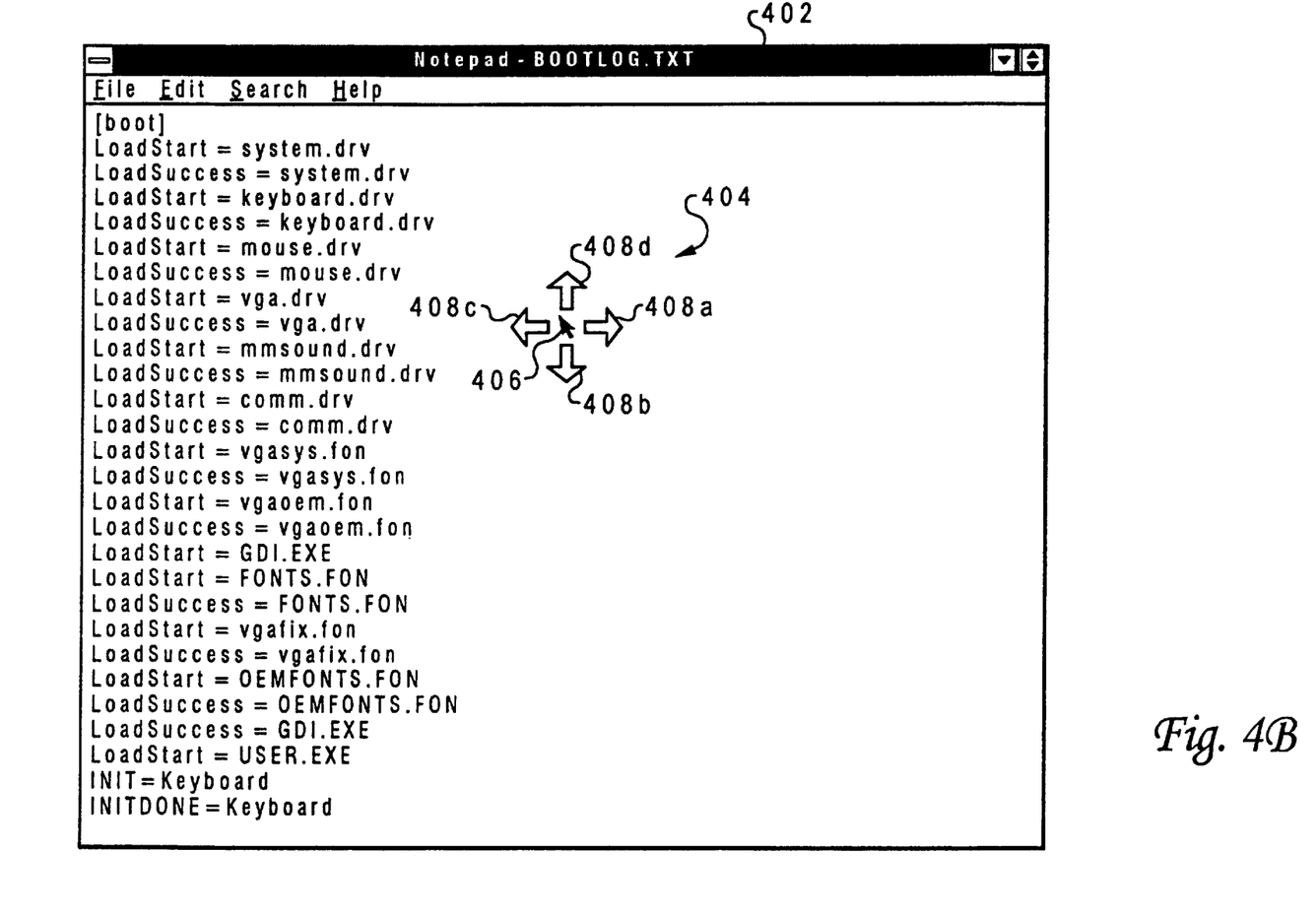

Referring to FIGS. 4A and 4B, pictorial representations of a graphical user interface employing a scroll indicating cursor in accordance with a preferred embodiment of the present invention are portrayed. As depicted in FIG. 4A, display 402 of a graphical user interface does not include scroll bars. However, display 402 includes a scroll indicating cursor 404 with cursor 406 and indicators 408a and 408b. The information display parameters of display 402 are determined at system initialization. Indicators 408a and 408b appear only on the sides of cursor 406 in the directions in which scrolling will display additional information. As depicted in FIG. 4B, if the display is scrolled so that additional information may be viewed by scrolling in additional directions, additional indicators 408c and 408d appear. The body of indicators 408a–408d may optionally be made transparent, revealing the underlying display, in order not to detract from the display. No particular size, shape, or color is required for the present invention. Additionally, information passed to a data processing system for the creation of scroll bars which would normally be displayed by a browser may be intercepted and employed to generate indicators in accordance with the present invention.

Figure 5:
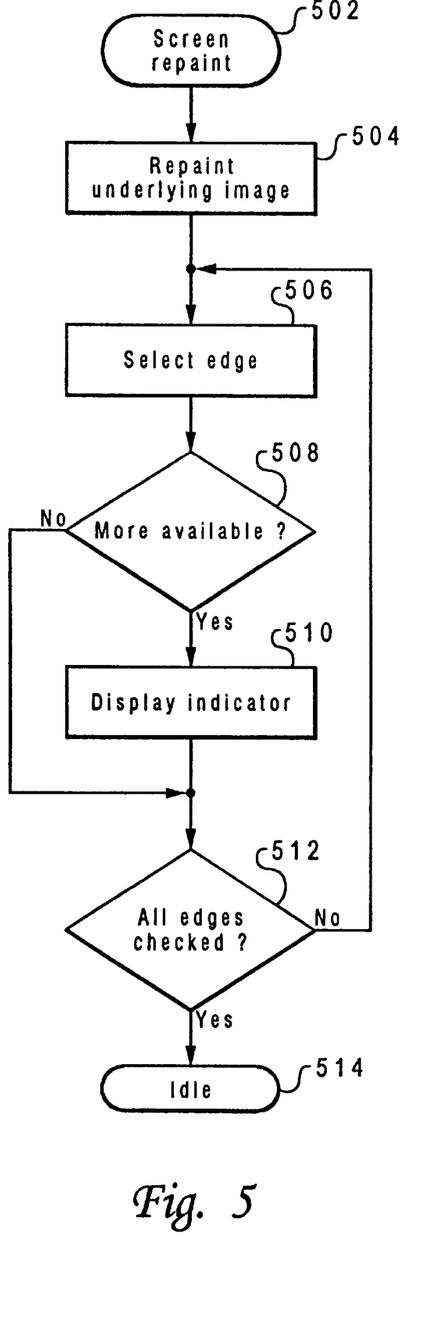
FIG. 5 depicts a high level flowchart for a process for providing a scroll indicating cursor in accordance with a preferred embodiment of the present invention.

With reference now to FIG. 5, a high level flowchart for a process for providing a scroll indicating cursor in accordance with a preferred embodiment of the present invention is depicted. The process begins at step 502, which depicts a screen repaint or redraw command being received. The process then passes to step 504, which illustrates repainting the underlying image, and then to step 506, which depicts selecting a direction to an edge of the display. The process passes next to step 508, which illustrates a determination of whether more information is available for viewing beyond the display in the direction selected. If more information than is presently displayed in the viewable area exists, the process proceeds to step 510, which depicts displaying a scrolling indicator to the side of the cursor in the direction currently selected, and then to step 512. If not, however, the process proceeds instead directly to step 512.

Step 512 illustrates a determination of whether all directions have been checked. If not, the process returns to step 506 for selection of another direction to be checked. If so, however, the process passes instead to step 514, which depicts the process becoming idle until the screen must again be repainted or redrawn.

Figure 6:
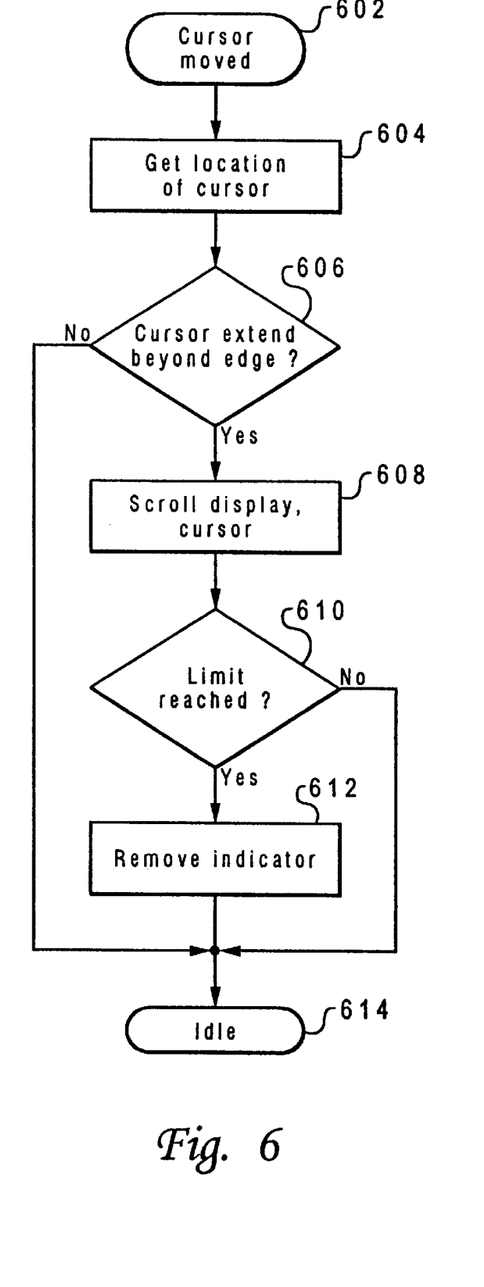
FIG. 6 is a high level flowchart for a process for employing a scroll indicating cursor in accordance with a preferred embodiment of the present invention.

Referring to FIG. 6, a high level flowchart for a process for employing a scroll indicating cursor in accordance with a preferred embodiment of the present invention is depicted. The process begins at step 602, which depicts detection of scrolling indicating cursor movement. The process then passes to step 604, which illustrates determination of the scrolling indicating cursor's new location, and then to step 606, which depicts a determination of whether a portion of the scrolling indicating cursor extends beyond the display edge. This may occur where a scrolling indicator appears between the cursor and the display edge, and the scrolling indicating cursor is moved to the edge such that at least a portion of the indicator extends beyond the edge of the display. If not, the process proceeds directly to step 614, described below.

If a portion of the scrolling indicating cursor extends beyond the display edge, the process proceeds to step 608, which illustrates scrolling the display in the direction of the indicator and proportionally moving the scrolling indicating cursor away from the display edge. The process then passes to step 610, which depicts a determination of whether the limit of available information in the direction of scrolling has been reached. If so, the process proceeds to step 612, which illustrates removing the indicator appearing to the side of the cursor in the direction of scrolling. Once the indicator is removed, the process proceeds to step 614, described below.

If additional information may be displayed by continuing to scroll in the same direction, however, the process proceeds instead directly to step 614, which depicts the process becoming idle until additional cursor movement is detected. A user holding the trackpoint in the remote control to one side will cause the process to be continually repeated until the limit of available information in a given direction is reached.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

The present invention provides a simple, intuitive substitute for conventional scroll bars in a graphical user interface. The scrolling indicator and mechanism of the present invention also occupies less display area than scroll bars. The integrated nature of the scrolling indicators and scrolling actuation mechanism facilitates intuitive use by a novice user. In general, any data processing system may be advantageously equipped with the present invention to improve the intuitive nature of the scrolling mechanism provided in a graphical user interface.

While the invention has been particularly shown and described with reference to a preferred embodiment, it will be understood by those skilled in the art that various changes in form and detail may be made therein without departing from the spirit and scope of the invention.

What is claimed is:

1. A method of providing a display control mechanism in a data processing system, comprising:

displaying information in a display area on a display in said data processing system;

displaying a cursor on said display;

determining a direction in which said display area may be scrolled to view additional information on said display;

displaying an indicator adjacent to said cursor indicating said direction; and moving said indicator in tandem with said cursor, wherein an intuitive scrolling indicator is provided for a graphical user interface to said data processing system.

2. The method of claim 1 wherein said step of displaying an indicator adjacent to said cursor in said direction further comprises displaying a graphical image representative of a mechanism for scrolling said display area in said direction.

3. The method of claim 1 wherein:

said step of determining a direction in which said display area may be scrolled to view additional information on said display further comprises determining each direction in which said display area may be scrolled to view additional information; and said step of displaying an indicator adjacent to said cursor further comprises displaying a plurality of indicators, one indicator within said plurality of indicators adjacent to said cursor in each direction in which said display area may be scrolled to view additional information.

4. The method of claim 1, further comprising:

responsive to a user moving an input device controlling said cursor, determining a location of said cursor within said display area;

determining whether said indicator extends beyond an edge of said display area; and responsive to determining that said indicator extends beyond an edge of said display area, scrolling said display area in said direction.

5. The method of claim 4, further comprising:

subsequent to said step of scrolling said display area in said direction, determining whether additional information may be viewed by additional scrolling of said display area in said direction; and responsive to determining that no additional information may be viewed by additional scrolling of said display area in said direction, removing said indicator from said display.

6. An apparatus for providing a display control mechanism in a data processing system, comprising:

first display means for displaying information in a display area on a display in said data processing system;

second display means for displaying a cursor on said display;

determination means for determining a direction in which said display area may be scrolled to view additional information on said display;

third display means for displaying an indicator adjacent to said cursor in said direction; and movement control means for moving said indicator in tandem with said cursor, wherein an intuitive scrolling indicator is provided for a graphical user interface to said data processing system.

7. The apparatus of claim 6 wherein said third display means further comprises means for displaying a graphical image representative of a mechanism for scrolling said display area in said direction.

8. The apparatus of claim 6 wherein:

said determination means further comprises means for determining each direction in which said display area may be scrolled to view additional information; and said third display means further comprises means for displaying a plurality of indicators, one indicator within said plurality of indicators adjacent to said cursor in each direction in which said display area may be scrolled to view additional information.

9. The apparatus of claim 6, further comprising:

second determination means, responsive to a user moving an input device controlling said cursor, for determining a location of said cursor within said display area;

third determination means for determining whether said indicator extends beyond an edge of said display area; and scrolling means, responsive to determining that said indicator extends beyond an edge of said display area, for scrolling said display area in said direction.

10. The apparatus of claim 9, further comprising:

fourth determination means for determining, after a scrolling of said display area in said direction, whether additional information may be viewed by additional scrolling of said display area in said direction; and fourth display means, responsive to determining that no additional information may be viewed by additional scrolling of said display area in said direction, for removing said indicator from said display.

11. A graphical user interface for a data processing system, comprising:

a display area displaying a portion of information contained within a memory in said data processing system; and a cursor displayed in said display area and moved within said display area by a pointing device; and an indicator displayed in said display area adjacent to said cursor in a direction in which said display area may be scrolled to view additional information contained within said memory, said indicator moving in tandem with said cursor and representative of a mechanism for scrolling said display area in said direction, wherein said display area contains a scrolling indicating cursor.

12. The graphical user interface of claim 11, further comprising:

a plurality of indicators displayed in said display area, one indicator within said plurality of indicators adjacent to said cursor in each direction in which said display area may be scrolled to view additional information contained within said memory, said plurality of indicators moving in tandem with said cursor.

13. The graphical user interface of claim 11, wherein movement of said cursor to a region of said display area where said indicator extends beyond an edge of said display area actuates said mechanism for scrolling said display area in said direction.

14. A computer program product for use with a data processing system, comprising:

a computer usable medium;

first instructions on said computer usable medium, for each direction in which a display area displaying information contained in a memory in said data processing system may be scrolled to view additional information in said display area, for displaying an indicator adjacent to a cursor in said direction, said indicator representative of a mechanism for scrolling said display area in said direction;

second instructions on said computer usable medium, responsive to a user manipulating an input device to move said cursor, for moving said indicator in tandem with said cursor;

third instructions on said computer usable medium, responsive to the user moving said cursor to a position in which said indicator extends beyond an edge of said display area, for scrolling said display area in said direction; and fourth instructions on said computer usable medium, responsive to a determination, after scrolling said display area in said direction, that no additional information may be viewed in said display area by addition scrolling of said display area in said direction, for removing said indicator from said display.

15. The computer program product of claim 14, wherein the computer computer usable medium is a hard disk drive.

16. The computer program product of claim 14, wherein the computer computer usable medium is a floppy disk.

17. The computer program product of claim 14, wherein the computer computer usable medium is a CD-ROM.

* * * * *

UNITED STATES PATENT AND TRADEMARK OFFICE
CERTIFICATE OF CORRECTION

PATENT NO. : 5,952,995
DATED : September 14, 1999
INVENTOR(S) : Stacey A. Barnes It is certified that error appears in the above-identified patent and that said Letters Patent is hereby corrected as shown below:

Page 1, Line 33 delete "skill s" and replace with --SKILLS--.

Page 4, Line 55 delete "204" and replace with --205--.

Signed and Sealed this

Twenty-ninth Day of August, 2000

Attest:

Q. TODD DICKINSON

Attesting Officer

Director of Patents and Trademarks